US012803916B2

(12) United States Patent
Kuroda

(10) Patent No.: US 12,803,916 B2
(45) Date of Patent: Nov. 17, 2026

(54) COMMUNICATION CONTROL SYSTEM AND COMMUNICATION CONTROL METHOD

(71) Applicant: NEC Corporation, Tokyo (JP)

(72) Inventor: Satoshi Kuroda, Tokyo (JP)

(73) Assignee: NEC CORPORATION, Tokyo (JP)

(*) Notice: Subject to any disclaimer, the term of this patent is extended or adjusted under 35 U.S.C. 154(b) by 111 days.

(21) Appl. No.: 18/670,796

(22) Filed: May 22, 2024

(65) Prior Publication Data

US 2025/0097156 A1 Mar. 20, 2025

(30) Foreign Application Priority Data

Sep. 19, 2023 (JP) ................................ 2023-151264

(51) Int. Cl.
*H04L 47/24* (2022.01)

(52) U.S. Cl.
CPC .................................. *H04L 47/24* (2013.01)

(58) Field of Classification Search
CPC ..................................................... H04L 47/24
See application file for complete search history.

(56) References Cited

U.S. PATENT DOCUMENTS 8,959,193 B2 * 2/2015 Tanaka .................. H04L 67/303 709/240
2004/0170181 A1 * 9/2004 Bogdon ................ H04L 45/306 370/395.42
2015/0263897 A1 * 9/2015 Ganichev ............... H04L 49/35 370/254
2016/0330245 A1 * 11/2016 Bell .................... H04L 63/0823
2018/0152877 A1 * 5/2018 Van Lieshout ....... H04W 40/02
2025/0097156 A1 * 3/2025 Kuroda .................. H04L 47/24

FOREIGN PATENT DOCUMENTS

JP 2008-532114 A 8/2008
JP 2017-038218 A 2/2017
WO 2020/105546 A1 5/2020

* cited by examiner

*Primary Examiner* — David R Lazaro
(74) *Attorney, Agent, or Firm* — Sughrue Mion, PLLC

(57) ABSTRACT

Provided is a communication control technique which makes it possible to efficiently utilize resources. A communication control system includes: a generation means for generating a storage request that includes (i) a plurality of identifier groups each of which includes one or more identifiers and (ii) priorities which are given to the respective plurality of identifier groups; and a requesting means for requesting a storage means to store information included in the storage request.

10 Claims, 9 Drawing Sheets

FIG. 10

NFP

| L1 | L2 | L3 | L4 |
|---|---|---|---|
| Nfprofile | Nfinstanceid | | |
| | Priority | | |
| | Bsfinfo | ipv4Address InfoList... | ipv4AddressRanges |
| | | | Ipv4AddressPriority |
| | | ipv6Address InfoList... | ipv6PrefixRanges |
| | | | Ipv6AddressPriority |

COMMUNICATION CONTROL SYSTEM AND COMMUNICATION CONTROL METHOD

This Nonprovisional application claims priority under 35 U.S.C. § 119 on Patent Application No. 2023-151264 filed in Japan on Sep. 19, 2023, the entire contents of which are hereby incorporated by reference.

TECHNICAL FIELD

The present disclosure relates to a communication control system and a communication control method.

BACKGROUND ART

A communication control system that controls communication between a plurality of terminals via a network is known. For example, Patent Literature 1 discloses a system in which a priority is set to each of routers in accordance with a load of that router, and a router having the highest priority is operated as a master.

CITATION LIST

Patent Literature

[Patent Literature 1]
Japanese Patent Application Publication Tokukai No. 2017-38218

SUMMARY OF INVENTION

Technical Problem

The system disclosed in Patent Literature 1 is intended to level loads of routers by setting priorities to the respective routers that can be regarded as nodes. The system has a problem from the viewpoint of efficient utilization of resources.

The present disclosure is accomplished in view of the above problem, and an example object thereof is to provide a communication control technique which can efficiently utilize resources.

Solution to Problem

A communication control system in accordance with an example aspect of the present disclosure includes at least one processor, the at least one processor carrying out: generating a storage request that includes (i) a plurality of identifier groups each of which includes one or more identifiers and (ii) priorities which are given to the respective plurality of identifier groups; and requesting a storage means to store information included in the storage request.

A communication control system in accordance with an example aspect of the present disclosure includes at least one processor, the at least one processor carrying out: making, to a storage means, a discovery request for a network function; and acquiring, as a response to the discovery request, response information that includes (i) a plurality of identifier groups each of which includes one or more identifiers and (ii) priorities which are given to the respective plurality of identifier groups.

A communication control method in accordance with example aspect of the present disclosure includes: generating, by at least one processor, a storage request that includes (i) a plurality of identifier groups each of which includes one or more identifiers and (ii) priorities which are given to the respective plurality of identifier groups; and requesting, by the at least one processor, a storage means to store information included in the storage request.

Advantageous Effects of Invention

According to an example aspect of the present disclosure, it is possible to bring about an example advantage of providing a communication control technique that can efficiently utilize resources.

BRIEF DESCRIPTION OF DRAWINGS

FIG. 10 is a diagram illustrating a data structure of profile information in accordance with an example aspect of the present disclosure.

EXAMPLE EMBODIMENTS

Figure 1:
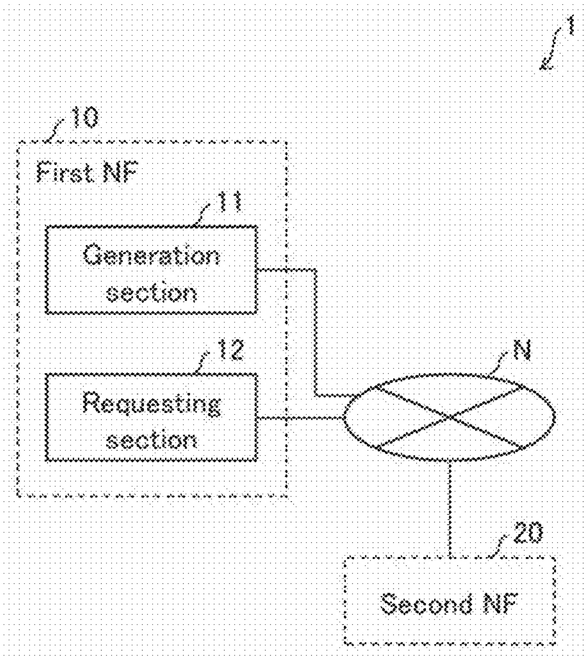
FIG. 1 is a block diagram illustrating a configuration of a communication control system in accordance with an example aspect of the present disclosure.

The following description will discuss an example embodiment of the present invention. Note, however, that the present invention is not limited to example embodiments described below, but may be altered in various ways by a skilled person within the scope of the claims. For example, the present invention also encompasses, in its scope, any example embodiment derived by appropriately combining technical means employed in the example embodiments described below. The present invention also encompasses, in its scope, any example embodiment derived by appropriately omitting part of technical means employed in the example embodiments described below. The example advantages described in each of the example embodiments below are example advantages expected in that example embodiment, and do not define an extension of the present invention. That is, the present invention also encompasses, in its scope, any example embodiment that does not bring about the example advantages described in the example embodiments below.

First Example Embodiment

The following description will discuss a first example embodiment, which is an example embodiment of the present invention, in detail with reference to the drawings. The present example embodiment is a basic form of example embodiments described later. Note that an application scope of technical means which are employed in the present example embodiment is not limited to the present example embodiment. That is, technical means employed in the present example embodiment can be employed also in the other example embodiments included in the present disclosure, within a range in which no particular technical problem occurs. Moreover, technical means indicated in the drawings referred to for describing the present example embodiment can be employed also in the other example embodiments included in the present disclosure, within a range in which no particular technical problem occurs.

(Configuration of Communication Control System 1)

The following description will discuss a configuration of a communication control system 1 in accordance with the present example embodiment, with reference to FIG. 1. FIG. 1 is a block diagram illustrating the configuration of the communication control system 1. As illustrated in FIG. 1, the communication control system 1 includes a first network function (hereinafter referred to also as "first NF") 10 and a second network function (hereinafter referred to also as "second NF") 20. As illustrated in FIG. 1, the first NF 10 and the second NF 20 are communicably connected to each other via a network N. A specific configuration of the network N does not limit the present example embodiment, and the network N is, for example, a wireless local area network (LAN), a wired LAN, a wide area network (WAN), a public network, a mobile data communication network, or a combination of these networks.

Note that, in the present example embodiment, the name "network function (NF)" is merely a name given to a configuration for realizing a function in the communication control system 1, and this name does not limit the present example embodiment. Each NF can be specifically realized by: one or more physical apparatuses (servers) realizing the function; one or more instances deployed in the one or more physical apparatuses; a virtual machine(s) deployed in the one or more physical apparatuses; or the like. Therefore, each NF in accordance with the present example embodiment may be expressed as a communication control apparatus. Note, however, that these specific implementation means do not limit the present example embodiment. This also applies to example embodiments described later.

An object to which the communication control system 1 is applied is not particularly limited. For example, in a case where the communication control system 1 is applied to a 5G core network, the name "network function (NF)" can be regarded to correspond to NFs constituting the 5G core network. This also applies to configurations and example embodiments described later.

(First NF 10)

As illustrated in FIG. 1, the first NF 10 includes a generation section 11 and a requesting section 12. The generation section 11 generates a storage request that includes (i) a plurality of identifier groups each of which includes more identifiers and (ii) priorities which are given to the respective plurality of identifier groups.

Here, the identifier is, for example, used to identify each element or each element group related to the communication system 1. The elements or element groups may be included in the communication system 1 and configured so as to be able to exchange data with each other. Alternatively, the elements or element groups may not be included in the communication system 1, and may be configured so as to be able to exchange data with each other via the communication system 1. In other words, the elements or element groups may be configured so as to be able to exchange data with each other via the network N described above or a network including the network N.

For example, the storage request is constituted by:

instruction information indicating that pieces of information included in the storage request are stored;

a first identifier group IDG1 including an identifier ID11, an identifier ID12, and an identifier ID13;

a second identifier group IDG2 including an identifier ID21, an identifier ID22, and an identifier ID23;

a priority P1 given to the first identifier group IDG1; and a priority P2 given to the second identifier group IDG2.

The identifier may be configured to include at least one selected from the group consisting of an IP address, a data network name, an IP domain, and an IP prefix.

The requesting section 12 transmits the storage request to the second NF 20. Here, the second NF 20 is an NF (also referred to as a storage section or storage means) that realizes a storage function and is connected to the network N. As such, the requesting section 12 transmits the storage request to the second NF 20, and thus requests the storage means to store information included in the storage request. Then, the second NF 20 which has received the storage request stores, in a storage medium, pieces of information included in the storage request.

For example, in a case where the communication control system 1 is applied to a 5G core network, the first NF 10 can be regarded to correspond to a binding support function (BSF) that maintains a correspondence between an IP address of each piece of user equipment (UE) and a policy control function (PCF), and the storage request can be regarded to correspond to an "NF register". Note, however, that the present example embodiment is not limited to these examples.

(Example Advantage of Communication Control System 1)

As described above, the communication control system 1 employs the configuration of: generating a storage request that includes (i) a plurality of identifier groups each of which includes one or more identifiers and (ii) priorities which are given to the respective plurality of identifier groups; and requesting a storage means to store information included in the storage request.

According to the communication control system 1 configured as described above, priorities are given to the respective plurality of identifier groups. Therefore, it is possible to provide a communication control technique which can efficiently utilize resources. The above configuration can be suitably applied to, for example, an nACT configuration having a redundancy. According to the above configuration, priorities are given to the respective plurality of identifier groups. Therefore, it is possible to realize an nACT configuration that can efficiently utilize resources as compared with, for example, an ACT/SBY configuration in which a priority is given for each instance.

Note that the above-described ACT/SBY configuration refers to, for example, a configuration in which a physical server (or instance) of a working system and a physical server (or instance) of a spare system are separately provided. The above-described nACT configuration refers to a configuration in which, unlike the ACT/SBY configuration, a physical server (or instance) of a working system functions also as a physical server (or instance) of a spare system without providing a physical server (or instance) dedicated to the spare system.

In the ACT/SBY configuration in which an instance of the spare system is made to wait as a spare for an instance of the working system (in other words, the ACT/SBY configuration in which priorities are given to respective instances), there is an aspect in which it is difficult to efficiently utilize resources (e.g., hardware resources) due to the instance of the spare system.

In contrast, according to the communication control system 1 described above, priorities are not given to respective instances but priorities are respectively given to a plurality of identifier groups. Therefore, it is not necessary to provide an instance dedicated to a spare system. Therefore, according to the communication control system 1 described above, it is possible to provide a communication control technique which can efficiently utilize resources.

(Flow of Communication Control Method S1)

Figure 2:
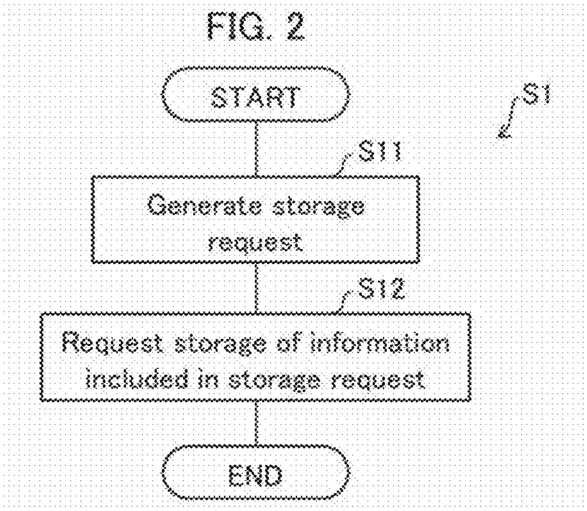
FIG. 2 is a flowchart illustrating a flow of a communication control method in accordance with an example aspect of the present disclosure.

The following description will discuss a flow of a communication control method S1 in accordance with the present example embodiment, with reference to FIG. 2. FIG. 2 is a flowchart illustrating the flow of the communication control method S1. As illustrated in FIG. 2, the communication control method S1 includes a process (step) S11 of generating a storage request and a process (step) S12 of requesting storage of information included in the storage request.

(Step S11)

In step S11, the generation section 11 of the communication control system 1 generates a storage request that includes (i) a plurality of identifier groups each of which includes one or more identifiers and (ii) priorities which are given to the respective plurality of identifier groups. The specific process by the generation section 11 has already been described above, and is therefore not repeatedly described here.

(Step S12)

In step S12, the requesting section 12 of the communication control system 1 transmits the storage request to the second NF 20, and thus requests the storage means to store information included in the storage request. The specific process by the requesting section 12 has already been described above, and is therefore not repeatedly described here.

(Example Advantage of Communication Control Method S1)

As described above, the communication control method S1 employs the configuration of: generating a storage request that includes (i) a plurality of identifier groups each of which includes one or more identifiers and (ii) priorities which are given to the respective plurality of identifier groups; and requesting a storage means to store information included in the storage request. Therefore, according to the communication control method S1, it is possible to provide a communication control technique that can efficiently utilize resources, as with the communication control system 1.

(Configuration of Communication Control System 2)

Figure 3:
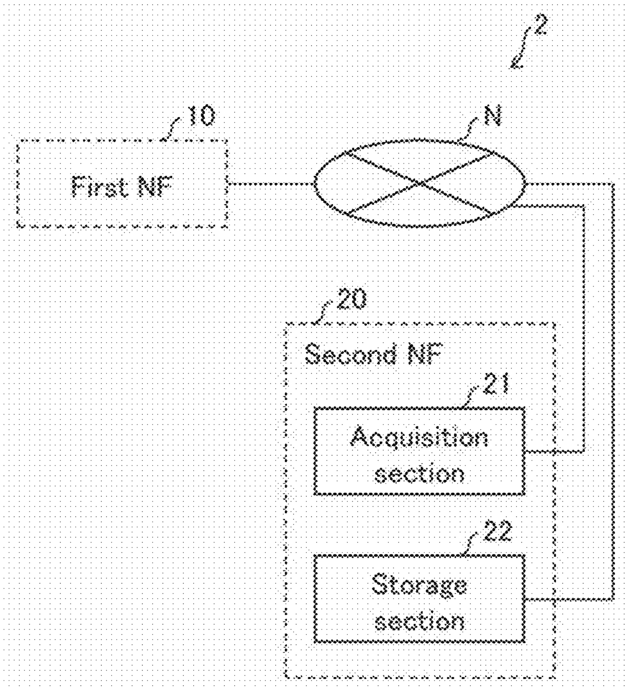
FIG. 3 is a block diagram illustrating a configuration of a communication control system in accordance with an example aspect of the present disclosure.

The following description will discuss a configuration of a communication control system 2 in accordance with the present example embodiment, with reference to FIG. 3. FIG. 3 is a block diagram illustrating the configuration of the communication control system 2. As illustrated in FIG. 3, the communication control system 2 includes a first NF 10 and a second NF 20. As illustrated in FIG. 3, the first NF 10 and the second NF 20 are communicably connected to each other via a network N. The specific example configuration of the network N has already been described above, and is therefore not repeatedly described here.

(Second NF 20)

As illustrated in FIG. 3, the second NF 20 includes an acquisition section 21 and a storage section 22. The acquisition section 21 acquires a storage request that includes (i) a plurality of identifier groups each of which includes one or more identifiers and (ii) priorities which are given to the respective plurality of identifier groups. The specific example configuration of the storage request has already been described above, and is therefore not repeatedly described here.

The storage section 22 stores information included in the storage request. For example, the storage section 22 stores, in a storage medium, pieces of information included in the storage request.

Note that the first NF 10 included in the communication control system 2 has, for example, a configuration similar to that of the first NF 10 included in the communication control system 1 described above. Note, however, that the present example embodiment is not limited to this example.

For example, in a case where the communication control system 2 is applied to a 5G core network, the second NF 20 can be regarded to correspond to a network repository function (NRF). Note, however, that the present example embodiment is not limited to this example.

(Example Advantage of Communication Control System 2)

As described above, the communication control system 2 employs the configuration of: acquiring a storage request that includes (i) a plurality of identifier groups each of which includes one or more identifiers and (ii) priorities which are given to the respective plurality of identifier groups; and storing information included in the storage request.

According to the communication control system 2 configured as described above, priorities are given to the respective plurality of identifier groups. Therefore, it is possible to provide a communication control technique which can efficiently utilize resources. The above configuration can be suitably applied to, for example, an nACT configuration having a redundancy. According to the above configuration, priorities are given to the respective plurality of identifier groups. Therefore, it is possible to realize an nACT configuration that can efficiently utilize resources as compared with, for example, an ACT/SBY configuration in which a priority is given for each instance.

(Flow of Communication Control Method S2)

Figure 4:
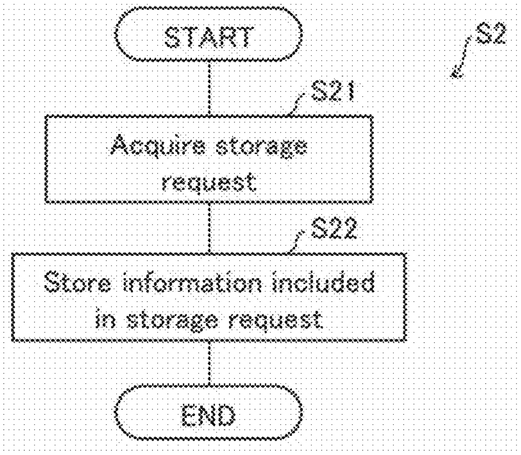
FIG. 4 is a flowchart illustrating a flow of a communication control method in accordance with an example aspect of the present disclosure.

The following description will discuss a flow of a communication control method S2 in accordance with the present example embodiment, with reference to FIG. 4. FIG. 4 is a flowchart illustrating the flow of the communication control method S2. As illustrated in FIG. 4, the communication control method S2 includes a process (step) S21 of acquiring a storage request and a process (step) S22 of storing information included in the storage request.

(Step S21)

In step S21, the acquisition section 21 of the communication control system 2 acquires a storage request that includes (i) a plurality of identifier groups each of which includes one or more identifiers and (ii) priorities which are given to the respective plurality of identifier groups.

(Step S22)

In step S22, the storage section 22 of the communication control system 2 stores information included in the storage request.

(Example Advantage of Communication Control Method S2)

As described above, the communication control method S2 employs the configuration of: acquiring a storage request that includes (i) a plurality of identifier groups each of which includes one or more identifiers and (ii) priorities which are given to the respective plurality of identifier groups; and storing information included in the storage request. Therefore, according to the communication control method S2, it is possible to provide a communication control technique that can efficiently utilize resources, as with the communication control system 2.

(Configuration of Communication Control System 3)

Figure 5:
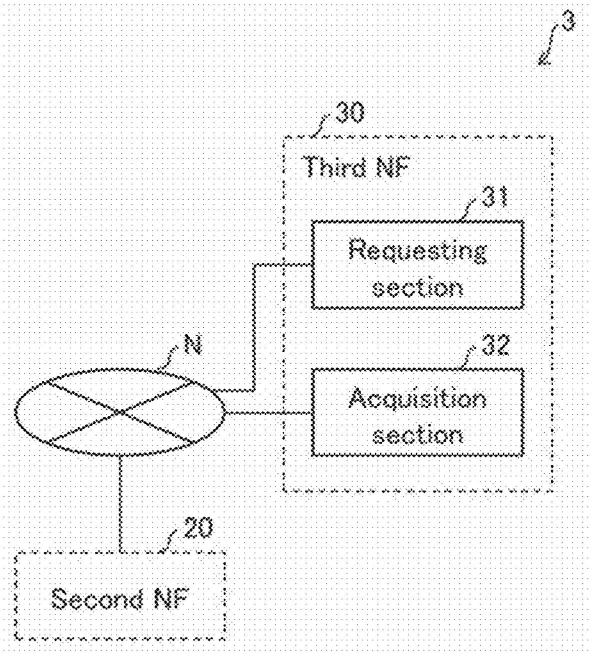
FIG. 5 is a block diagram illustrating a configuration of a communication control system in accordance with an example aspect of the present disclosure.

The following description will discuss a configuration of a communication control system 3 in accordance with the present example embodiment, with reference to FIG. 5. FIG. 5 is a block diagram illustrating the configuration of the communication control system 3. As illustrated in FIG. 5, the communication control system 3 includes a second NF 20 and a third NF 30. As illustrated in FIG. 5, the second NF 20 and the third NF 30 are communicably connected to each other via the network N. The specific example configuration of the network N has already been described above, and is therefore not repeatedly described here.

(Third NF 30)

As illustrated in FIG. 5, the third NF 30 includes a requesting section 31 and an acquisition section 32. The requesting section 31 makes, to a storage means, a discovery request for a network function. Here, the storage means can be a second NF 20 that has a storage function and is connected to the network N. Note, however, that the present example embodiment is not limited to this example. The term "discovery request" refers to requesting identification and provision of intended information, and this specific term does not limit the present example embodiment.

The acquisition section 32 acquires, as a response to the discovery request, response information that includes (i) a plurality of identifier groups each of which includes one or more identifiers and (ii) priorities which are given to the respective plurality of identifier groups. For example, the response information is constituted by:

- a first identifier group IDG1 including an identifier ID11, an identifier ID12, and an identifier ID13;
- a second identifier group IDG2 including an identifier ID21, an identifier ID22, and an identifier ID23;
- a priority P1 given to the first identifier group IDG1; and
- a priority P2 given to the second identifier group IDG2.

The identifier may be configured to include at least one selected from the group consisting of an IP address, a data network name, an IP domain, and an IP prefix.

For example, in a case where the communication control system 3 is applied to a 5G core network, the third NF 30 can be regarded to correspond to an application function (AF) or a network exposure function (NEF), and the "discovery request for a network function" can be regarded to correspond to an "NF discovery". Note, however, that the present example embodiment is not limited to these examples.

(Example Advantage of Communication Control System 3)

As described above, the communication control system 3 employs the configuration of: making, to a storage means, a discovery request for a network function; and acquiring, as a response to the discovery request, response information that includes (i) a plurality of identifier groups each of which includes one or more identifiers and (ii) priorities which are given to the respective plurality of identifier groups.

According to the communication control system 3 configured as described above, priorities are given to the respective plurality of identifier groups. Therefore, it is possible to provide a communication control technique which can efficiently utilize resources. The above configuration can be suitably applied to, for example, an nACT configuration having a redundancy. According to the above configuration, priorities are given to the respective plurality of identifier groups. Therefore, it is possible to realize an nACT configuration that can efficiently utilize resources as compared with, for example, an ACT/SBY configuration in which a priority is given for each instance.

(Flow of Communication Control Method S3)

Figure 6:
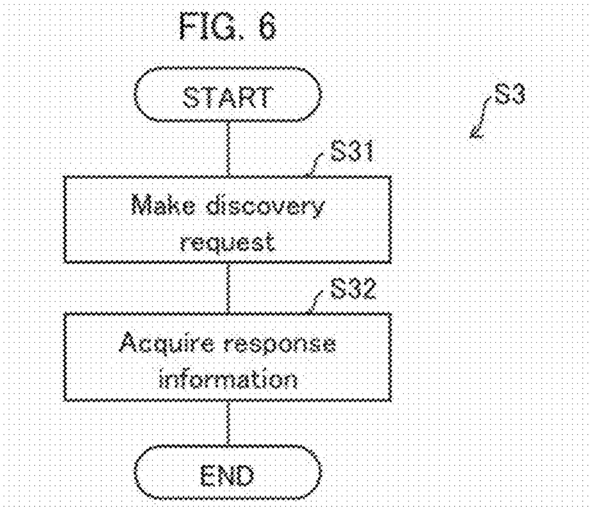
FIG. 6 is a flowchart illustrating a flow of a communication control method in accordance with an example aspect of the present disclosure.

The following description will discuss a flow of a communication control method S3 in accordance with the present example embodiment, with reference to FIG. 6. FIG. 6 is a flowchart illustrating the flow of the communication control method S3. As illustrated in FIG. 6, the communication control method S3 includes a process (step) S31 of making a discovery request and a process (step) S32 of acquiring response information.

(Step S31)

In step S31, the requesting section 31 of the communication control system 3 makes, to the storage means, a discovery request for a network function. The specific process by the requesting section 31 has already been described above, and is therefore not repeatedly described here.

(Step S32)

In step S32, the acquisition section 32 of the communication control system 3 acquires, as a response to the discovery request, response information that includes (i) a plurality of identifier groups each of which includes one identifiers and (ii) priorities which are given to the respective plurality of identifier groups. The specific process by the acquisition section 32 has already been described above, and is therefore not repeatedly described here.

(Example Advantage of Communication Control Method S3)

As described above, the communication control method S3 employs the configuration of: making, to a storage means, a discovery request for a network function; and acquiring, as a response to the discovery request, response information that includes (i) a plurality of identifier groups each of which includes one or more identifiers and (ii) priorities which are given to the respective plurality of identifier groups. Therefore, according to the communication control method S3, it is possible to provide a communication control technique that can efficiently utilize resources, as with the communication control system 3.

Second Example Embodiment

The following description will discuss a second example embodiment, which is an example embodiment of the present invention, in detail with reference to the drawings. The same reference numerals are given to constituent elements having the same functions as those described in the foregoing example embodiment, and descriptions of such constituent elements are omitted as appropriate. Note that an application scope of technical means which are employed in the present example embodiment is not limited to the present example embodiment. That is, technical means employed in the present example embodiment can be employed also in the other example embodiments included in the present disclosure, within a range in which no particular technical problem occurs. Moreover, technical means indicated in the drawings referred to for describing the present example embodiment can be employed also in the other example embodiments included in the present disclosure, within a range in which no particular technical problem occurs.

(Configuration of Communication Control System 1A)

Figure 7:
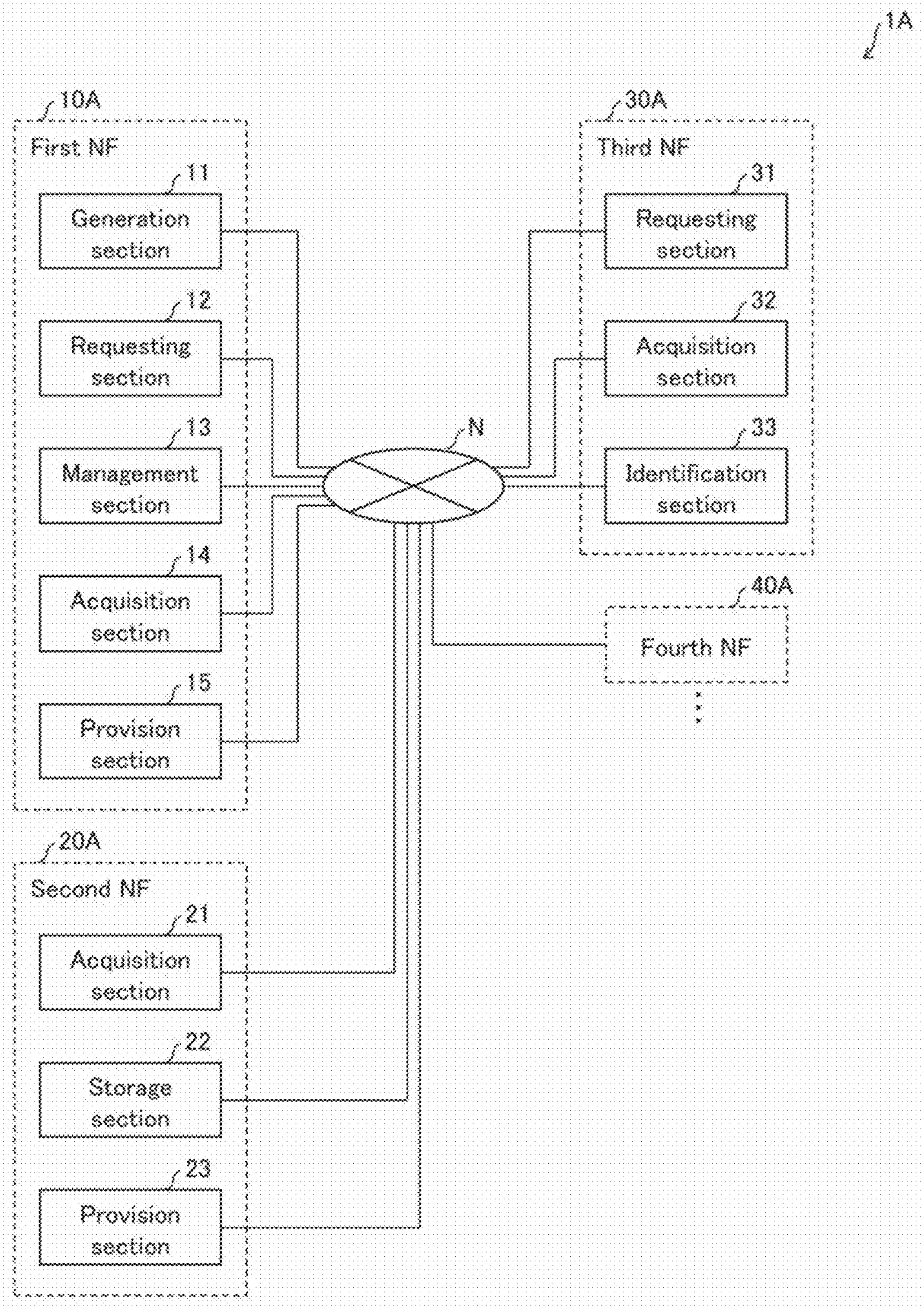
FIG. 7 is a block diagram illustrating a configuration of a communication control system in accordance with an example aspect of the present disclosure.

The following description will discuss a configuration of a communication control system 1A in accordance with the present example embodiment, with reference to FIG. 7. FIG. 7 is a block diagram illustrating the configuration of the communication control system 1A. As illustrated in FIG. 7, the communication control system 1A includes a first NF 10A, a second NF 20A, a third NF 30A, a fourth NF 40A, and the like.

(First NF 10A)

As illustrated in FIG. 7, the first NF 10A includes a management section 13, an acquisition section 14, and a provision section 15, in addition to the generation section 11 and the requesting section 12 included in the first NF 10 in accordance with the first example embodiment.

(Generation Section 11)

As described in the first example embodiment, the generation section 11 generates a storage request that includes (i) a plurality of identifier groups each of which includes one or more identifiers and (ii) priorities which are given to the respective plurality of identifier groups. Here, the identifier may be configured to include at least one selected from the group consisting of an IP address, a data network name, an IP domain, and an IP prefix. For example, in a case where the identifier is an IP address and the communication control system 1A is applied to a 5G core network, the storage request can be expressed as follows:

NF Register (
IPrange: A, priority: 100
IPrange: B, priority: 200
)

The "NF register" in the 1st line in the storage request indicates that the storage request is a registration request related to an NF, and serves as instruction information for requesting the storage means to store pieces of information in the parentheses. The 2nd line and the 3rd line in the storage request indicate that a priority of 100 is given to an IP address band A, and a priority of 200 is given to an IP address band B. Here, the IP address band A and the IP address band B are each information including a plurality of ID addresses, and are each an example of the "identifier group" described above.

Note that an identifier name or an attribute name of an identifier group described above in a case where the communication control system 1A is applied to a 5G core network is exemplified as follows. The identifier name or attribute name of the identifier group indicated below corresponds to, for example, a matter specified as "Type: BsfInfo" in the 5G standard. Note, however, that the present example embodiment is not limited to the example below. The communication control system 1A can also be applied to corresponding identifiers and identifier groups in other communication standards, and aspects of such an embodiment are also encompassed in the present example embodiment.

<Examples of Identifier Name or Attribute Name of Identifier Group> ipv4AddressRanges: IP address band
dnnList: List of data network name (DNN)
ipDomainList: List of IP domains
ipv6PrefixRanges: IP prefix band
rxDiamHost: Diameter host of Rx interface of BSF
rxDiamRealm: Diameter realm of Rx interface of BSF
groupId: BSF group ID
supiRanges: Range of SUPI provided by BSF
gpsiRanges: Range of GPSI provided by BSF (Requesting Section 12)

The requesting section 12 transmits the storage request to the second NF 20A. The second NF 20A is an NF (also referred to as a storage section or storage means) that realizes a storage function and is connected to the network N. A specific configuration thereof will be described later. As such, the requesting section 12 transmits the storage request to the second NF 20A, and thus requests the storage means to store information included in the storage request. Then, the second NF 20A which has received the storage request stores, in a storage medium, pieces of information included in the storage request.

In a case where the communication control system 1A is applied to a 5G core network, the first NF 10A can be regarded to correspond to a binding support function (BSF) that maintains a correspondence between an IP address of each piece of user equipment (UE) and a policy control function (PCF), and the storage request can be regarded to correspond to an "NF register" as described above. Note, however, that the present example embodiment is not limited to these examples.

(Management Section 13)

The management section 13 functions as a management means for managing the plurality of identifier groups. The management section 13 manages, in a same instance, a plurality of identifier groups to which different priorities are given. With this configuration, for example, for each of one or more instances deployed to function as first NFs 10A in a physical server, a plurality of identifier groups to which different priorities are given are managed in the same instance.

As described above, in the first NF 10A, for each of one or more instances, a plurality of identifier groups to which different priorities are given are managed in the same instance. Therefore, it is possible to provide a communication control technique which can efficiently utilize resources. The above configuration can be suitably applied to, for example, an nACT configuration having a redundancy. According to the above configuration, priorities are given to the respective plurality of identifier groups. Therefore, it is possible to realize an nACT configuration that can efficiently utilize resources as compared with, for example, an ACT/SBY configuration in which a priority is given for each instance.

(Acquisition Section 14)

The acquisition section 14 acquires request information that includes a target identifier. For example, the acquisition section 14 acquires the request information from the third NF 30A. Here, the target identifier is, for example, an identifier for identifying user equipment (UE) to be called via the communication control system 1A. The target identifier may include, for example, at least one selected from the group consisting of an IP address, a data network name, an IP domain, and an IP prefix. More specifically, the target identifier may be configured to include identifiers exemplified in <Examples of identifier name or attribute name of identifier group>. A specific example process carried out by the acquisition section 14 will be described later.

(Provision Section 15)

The provision section 15 provides, as a response to the request information, response information that includes a network function address associated with the target identifier. For example, in a case where the acquisition section 14 has acquired the request information from the third NF 30A, the provision section 15 provides, to the third NF 30A, response information that includes a network function address associated with the target identifier, as a response to the request information.

The response information includes (i) a plurality of identifier groups each of which includes one or more identifiers and (ii) priorities which are given to the respective plurality of identifier groups. More specifically, the response information includes (i) a plurality of identifier groups including the target identifier and (ii) priorities given to the respective plurality of identifier groups. A specific example process carried out by the provision section 15 will be described later.

(Second NF 20A)

The following description will discuss the second NF 20A. As illustrated in FIG. 7, the second NF 20A includes a provision section 23, in addition to the acquisition section 21 and the storage section 22 included in the second NF 20 in accordance with the first example embodiment.

(Acquisition Section 21)

As described in the first example embodiment, the acquisition section 21 acquires a storage request that includes (i) a plurality of identifier groups each of which includes one or more identifiers and (ii) priorities which are given to the respective plurality of identifier groups. The specific example configuration of the storage request has already been described above, and is therefore not repeatedly described here.

The acquisition section 21 acquires a discovery request for a network function from another NE included in the communication control system 1A. For example, the acquisition section 21 acquires a discovery request for a network function from the third NF 30A (described later).

(Storage Section 22)

As described in the first example embodiment, the storage section 22 stores information included in the storage request. For example, the storage section 22 stores, in a storage medium, pieces of information included in the storage request.

(Provision Section 23)

The provision section 23 provides, to another NF included in the communication control system 1A, response information that includes (i) a plurality of identifier groups each of which includes one or more identifiers and (ii) priorities which are given to the respective plurality of identifier groups. For example, in a case where the acquisition section 21 has acquired a discovery request for a network function from another NF included in the communication control system 1A, the provision section 23 provides, as a response to the discovery request, the response information to the another NF. For example, the response information is constituted by:

- a first identifier group IDG1 including an identifier ID11, an identifier ID12, and an identifier ID13;
- a second identifier group IDG2 including an identifier ID21, an identifier ID22, and an identifier ID23;
- a priority P1 given to the first identifier group IDG1; and
- a priority P2 given to the second identifier group IDG2.

The identifier may be configured to include at least one selected from the group consisting of an IP address, a data network name, an IP domain, and an IP prefix. Specific examples of the identifier and the identifier group which may be included in the response information include those described in <Examples of identifier name or attribute name of identifier group>. Note, however, that the present example embodiment is not limited to those examples.

(Third NF 30A)

The following description will discuss a third NF 30A. As illustrated in FIG. 7, the third NF 30A includes an identification section 33, in addition to the requesting section 31 and the acquisition section 32 included in the third NF 30 in accordance with the first example embodiment.

(Requesting Section 31)

As described in the first example embodiment, the requesting section 31 makes, to the storage means, a discovery request for a network function. For example, the requesting section 31 makes a discovery request for a network function to the second NF 20A. As described in the first example embodiment, the term "discovery request" refers to requesting identification and provision of intended information, and this specific term does not limit the present example embodiment.

(Acquisition Section 32)

As described in the first example embodiment, the acquisition section 32 acquires, as a response to the discovery request, response information that includes (i) a plurality of identifier groups each of which includes one or more identifiers and (ii) priorities which are given to the respective plurality of identifier groups.

(Identification Section 33)

The identification section 33 identifies, with reference to the priorities included in the response information, a network function to be accessed. For example, the identification section 33 identifies a network function to be accessed by comparing the priorities given to the respective plurality of identifier groups in which a target identifier is included.

More specifically, the identification section 33 determines, with reference to the priorities, which one of a plurality of network functions belonging to the same category is to be accessed. For example, in a case where the response information is as follows:

```
BSF1 (
IPrange: A, priority: 100
IPrange: B, priority: 200
),
BSF2 (
IPrange: A, priority: 200
IPrange: B, priority: 100
),
```

which indicates that

- BSF 1 manages an IP address band A to which a priority of 100 is given and an IP address band B to which a priority of 200 is given, and
- BSF2 manages an IP address band A to which a priority of 200 is given and an IP address band B to which a priority of 100 is given,
- the identification section 33 determines, with reference to the priorities given to the respective IP address bands, which one of the BSF 1 and BSF 2, which are NFs belonging to the same category, is to be accessed. In the above example, it is assumed that a smaller priority value indicates a higher priority.

For example, in a case where an IP address band in which the target identifier is included is the IP address band A, the identification section 33 compares (i) the priority of 100 given to the IP address band A associated with the BSF 1 with (ii) the priority of 200 given to the IP address band A associated with the BSF 2, and selects the BSF 1 associated with the IP address band A to which the higher priority (the smaller value in this example) is given.

Meanwhile, in a case where an IP address band in which the target identifier is included is the IP address band B, the identification section 33 compares (i) the priority of 200 given to the IP address band B associated with the BSF 1 with (ii) the priority of 100 given to the IP address band B associated with the BSF 2, and selects the BSF 2 associated with the IP address band B to which the higher priority (the smaller value in this example) is given.

As such, the identification section 33 compares the priorities given to the respective plurality of identifier groups (the IP address band A and IP address band B in the above example) in which the target identifier is included, and this makes it possible to suitably identify a network function (BSF 1 or BSF 2 in the above example) to be accessed.

(Fourth NF 40A)

For example, the fourth NF 40A manages, for a plurality of identifiers, the identifiers and pieces of relevant information associated with the identifiers. For example, the fourth NF 40A manages, for each of a plurality of IP addresses included in an IP address group, a policy (policy rule) associated with that IP address. In a case where the communication control system 1A is applied to a 5G core network, the policy rule is, for example, information that is referred to for controlling a plane function such as a user plane function (UPF), and includes rules related to network slicing, roaming, mobility management, and the like.

Note that, in a case where the communication control system 1A is applied to a 5G core network, the fourth NF 40A can be regarded to correspond to, for example, a policy control function (PCF). Note, however, that the present example embodiment is not limited to this example.

(Specific Example Configuration of Communication Control System 1A)

Figure 8:
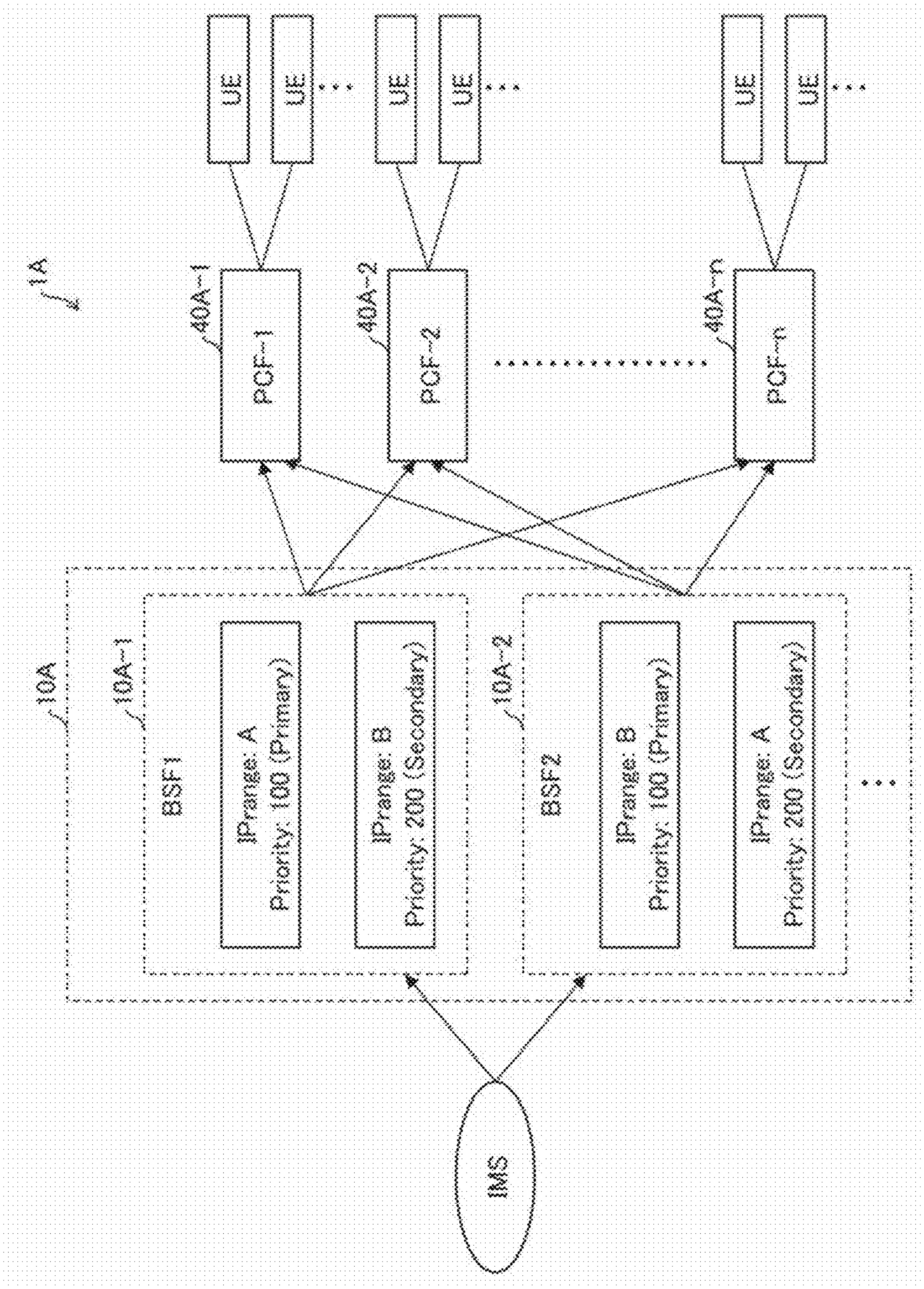
FIG. 8 is a block diagram illustrating a configuration of a communication control system in accordance with an example aspect of the present disclosure.

Next, a specific example configuration of the communication control system 1A will be described with reference to FIG. 8. FIG. 8 is a diagram schematically illustrating a specific example configuration of the communication control system 1A. In the example illustrated in FIG. 8, the communication control system 1A includes the first NF 10A described above and a plurality of fourth NFs 40A (40A-1, 40A-2, . . . , 40A-n in FIG. 8).

Here, the first NF 10A includes a plurality of instances. Among the plurality of instances, the first instance is denoted by a reference numeral 10A-1, and the second instance is denoted by a reference numeral 10A-2. The plurality of instances may be deployed on different physical servers, or may be deployed on a single physical server. As illustrated in FIG. 8, in this example, the first NF 10A functions as a binding support function (BSF) in the 5G core network. The first instance 10A-1 is called a BSF 1, and the second instance 10A-2 is called a BSF 2.

Each of the plurality of fourth NFs 40A illustrated in FIG. 8 functions as a policy control function (PCF) in the 5G core network. More specifically, the fourth NF 40A-1, the fourth NF 40A-2, . . . , and the fourth NF 40A-n function as PCF-1, PCF-2, . . . , PCF-n, respectively.

As illustrated in FIG. 8, each of the PCFs manages policy rules respectively corresponding to a plurality of pieces of user equipment (UE). Note that, in some cases, such a relationship between the PCFs and the UEs is expressed as follows: "UEs are separately accommodated in a plurality of PCFs".

In such a configuration, in a case where an IP multimedia subsystem (IMS) intends to access a particular UE, the following processes are carried out.

(Process 1)

In order to identify a PCF that accommodates a UE to be called, the IMS queries the BSF using, as a key, an IP address (also referred to as a target identifier, target IP address, or the like) of the UE to be called. The query may include, for example, a discovery request from the third NF 30A (AF/NEF) to the second NF 20A (NRF) included in the communication control system 1A.

(Process 2)

Then, the IMS identifies, with reference to response information to the query from the BSF, a PCF that accommodates the UE to be called. The response information may include response information that is provided from the second NF 20A (NRF) to the third NF 30A (AF/NEF) as a response to the discovery request.

As illustrated in FIG. 8, the first NF 10A (BSF) manages, for each of the plurality of instances, a plurality of identifier groups to which different priorities are given in the same instance.

More specifically, in the first instance 10A-1, the first NF 10A manages IPrange: A, Priority: 100 (Primary)

IPrange: B, Priority: 200 (Secondary) and in the second instance 10A-2, the first NF 10A manages IPrange: B, Priority: 100 (Primary)

IPrange: A, Priority: 200 (Secondary).

As such, by preparing a plurality of identical IP address bands (identical identifier groups), and giving different priorities to the respective identical IP address bands, it is possible to suitably realize an nACT configuration having a redundancy. According to the above configuration, priorities are given to the respective plurality of identifier groups. Therefore, it is possible to realize an nACT configuration that can efficiently utilize resources as compared with, for example, an ACT/SBY configuration in which a priority is given for each instance.

(Flow of Process by Communication Control System 1A)

Figure 9:
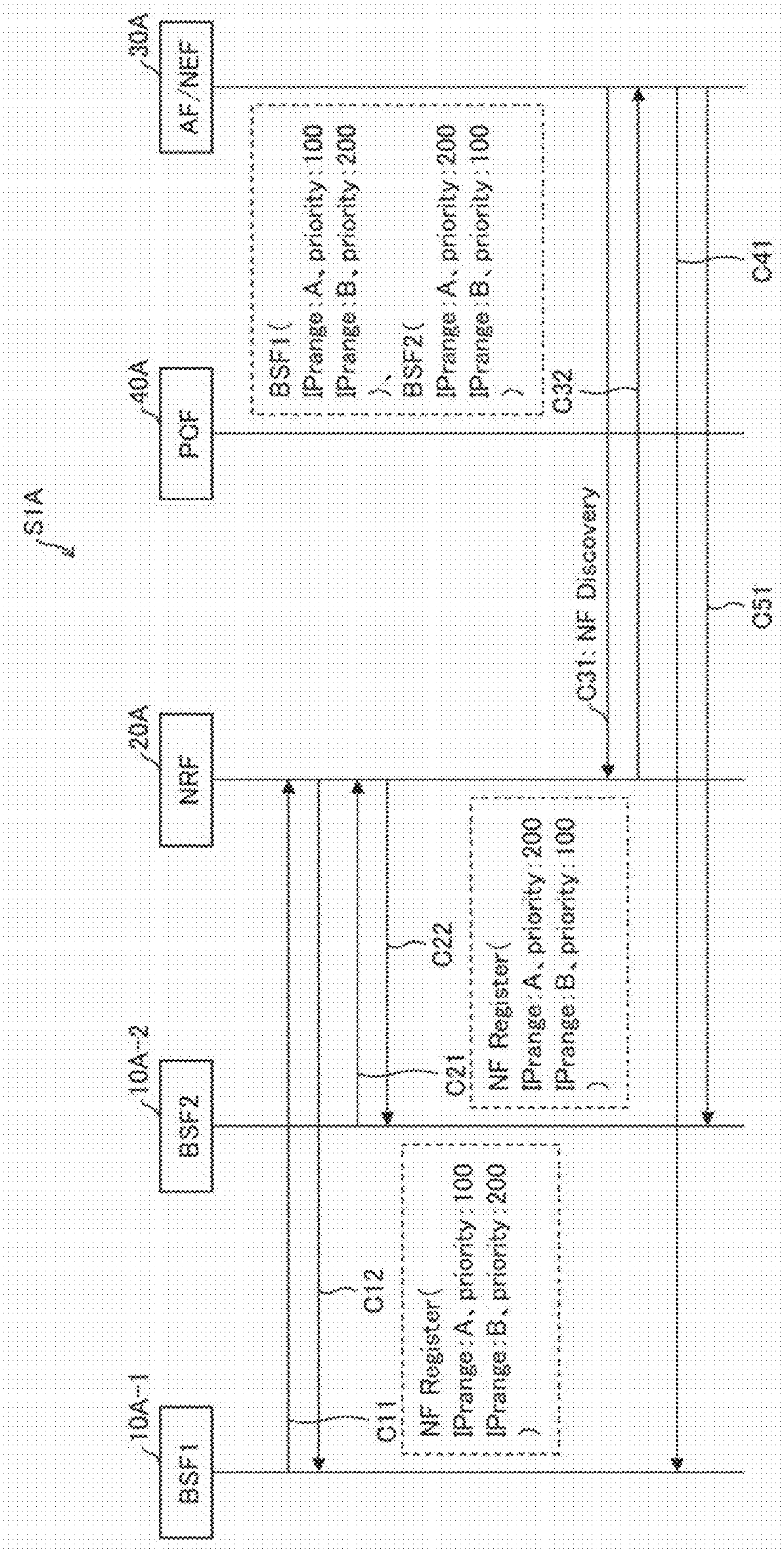
FIG. 9 is a sequence diagram illustrating a flow of a communication control method in accordance with an example aspect of the present disclosure.

The following description will discuss an example of a flow of process by the communication control system 1A, with reference to FIG. 9. FIG. 9 is a sequence diagram illustrating an example of the flow of process by the communication control system 1A. As illustrated in FIG. 9, the flow of process by the communication control system 1A includes the following processes.

(Process 11)

The BSF 1 (first NF 10A-1) generates a storage request C11 that includes (i) a plurality of identifier groups each of which includes one or more identifiers and (ii) priorities which are given to the respective plurality of identifier groups, and transmits the generated storage request C11 to the NRF (second NF 20A, storage means).

For example, as illustrated in FIG. 9, the storage request C11 generated and transmitted by the BSF 1 is expressed as follows.

```
NF Register (
IPrange: A, priority: 100
IPrange: B, priority: 200
)
```

The example of the storage request expressed as above has already been described, and is therefore not repeatedly described here.

(Process 12)

The NRF (second NF 20A) that has received the storage request C11 stores, in a storage medium, the following pieces of information included in the storage request "NF register".

IPrange: A, priority: 100

IPrange: B, priority: 200

The storage medium may be included in the NRF itself or may be present separately from the NRF. The NRF (second NF 20A) storing the pieces of information transmits, for example, ACK information C12 indicating that storage of the pieces of information is completed to the BSF 1 (first NF 10A-1).

(Process 21)

Similarly, the BSF 2 (first NF 10A-2) generates a storage request C21 that includes (i) a plurality of identifier groups each of which includes one or more identifiers and (ii) priorities which are given to the respective plurality of identifier groups, and transmits the generated storage request C21 to the NRF (second NF 20A, storage means).

For example, as illustrated in FIG. 9, the storage request C21 generated and transmitted by the BSF 2 is expressed as follows.

```
NF Register (
IPrange: A, priority: 200
IPrange: B, priority: 100
)
```

As such, in the storage request C21 in accordance with this example, unlike the storage request C11 described above, a higher priority (smaller value) is given to the IP address band B.

(Process 22)

The NRF (second NF 20A) that has received the storage request C21 stores, in a storage medium, the following pieces of information included in the storage request "NF register".

IPrange: A, priority: 200

IPrange: B, priority: 100

The storage medium may be included in the NRF itself or may be present separately from the NRF. The NRF (second NF 20A) storing the pieces of information transmits, for example, ACK information C22 indicating that storage of the pieces of information is completed to the BSF 2 (first NF 10A-2).

(Process 31)

In a case where it is necessary to make a query about the target identifier, the AF/NEF (third NF 30A) makes a discovery request C31 to the NRF (second NF 20A). For example, the AF/NEF (third NF 30A) makes a discovery request "NF discovery" related to a network function to the NRF (second NF 20A).

(Process 32)

The NRF (second NF 20A) which has received the discovery request provides, to the AF/NEF (third NF 30A), response information C32 which includes information related to a plurality of NFs belonging to the same category.

For example, the NRF (second NF 20A) provides, to the AF/NEF (third NF 30A), the response information C32 including the following items:

- a plurality of identifier groups managed by the first BSF instance BSF1 and priorities given to the respective plurality of identifier groups, and
- a plurality of identifier groups managed by the second BSF instance BSF2 and priorities given to the respective plurality of identifier groups.

More specifically, the response information C32 is expressed as follows, as illustrated in FIG. 9.

```
BSF1 (
IPrange: A, priority: 100
IPrange: B, priority: 200
),
BSF2 (
IPrange: A, priority: 200
IPrange: B, priority: 100
)
```

The response information expressed as above has already been described, and therefore specific descriptions thereof are omitted here.

The AF/NEF (third NF 30A) which has acquired the response information C32 identifies, with reference to the priorities included in the response information C32, a network function to be accessed. For example, in a case where an IP address band in which the target identifier is included is the IP address band A, the identification section 33 of the AF/NEF (third NF 30A) selects the BSF 1 associated with the IP address band A to which a higher priority (a smaller value in this example) is given.

Meanwhile, in a case where an IP address band in which the target identifier is included is the IP address band B, the identification section 33 of the AF/NEF (third NF 30A) selects the BSF 2 associated with the IP address band B to which a higher priority (a smaller value in this example) is given. The specific process by the identification section 33 has already been described above, and is therefore not repeatedly described here.

(Process 41, Process 51)

Then, the AF/NEF (third NF 30A) accesses, out of the BSF 1 and BSF 2, the BSF selected (identified) in process 32. For example, the AF/NEF (third NF 30A) transmits, to the BSF (BSF 1 or BSF 2), request information (C41 or C51) requesting notification of a network function address (NFaddress) of a PCF associated with the target identifier (IP address).

Then, the BSF which has received the request information notifies the AF/NEF (third NF 30A) of a network function address (NFaddress) of a PCF that manages the target identifier (IP address) among a plurality of PCFs (plurality of fourth NFs 40A).

The AF/NEF (third NF 30A) accesses the PCF indicated in the notification, and the PCF carries out a connection process of a UE associated with the target identifier.

(Example of Network Profile Information)

The following description will discuss, with reference to FIG. 10, network profile information NFP which is generated by the communication control system 1A and which is referred to. At least a part of a data structure of the network profile information NFP is also an example of a data structure of a storage request from the first NF 10A (BSF) to the second NF 20A (NRF) and a data structure of response information from the second NF 20A (NRF) to the third NF 30A (AF/NEF). For example, in a case where the communication control system 1A is applied to a 5G core network, the network profile information NFP can be regarded also as an example of "NF profile".

As illustrated in FIG. 10, the network profile information NFP has a hierarchical data structure having layers L1 through L4. The layer L1 includes "Nfprofile" indicating that the information is network profile information.

The layer L2 is a lower layer of the layer L1. For example, as illustrated in FIG. 10, the layer L2 includes "Nfinstanceid", "Priority", and "Bsfinfo". Note that the "Priority" indicates a priority given for each instance, and is not essential in the communication control system 1A. The "Bsfinfo" includes "ipv4Address InfoList . . . " and "ipv6Address InfoList . . . " in the layer L3, which is a lower layer thereof.

The "ipv4Address InfoList . . . " includes "ipv4AddressRanges" and "Ipv4AddressPriority" associated with each of "ipv4AddressRanges" in the layer L4, which is a lower layer thereof. The "ipv4AddressRanges" is an example of the IP address band (identifier group) described above. The "Ipv4AddressPriority" is an example of priorities associated with (given to) the respective IP address bands.

The "ipv6Address InfoList . . . " includes "ipv6PrefixRanges" and "Ipv6AddressPriority" associated with each of the "ipv6PrefixRanges" in the layer 4, which is a lower layer thereof. The "ipv6PrefixRanges" is an example of an IP prefix band (identifier group) which is an example of an identifier. The "Ipv6AddressPriority" is an example of priorities associated with (given to) the respective IP prefix bands.

As such, the priorities in accordance with the present example embodiment can be assigned to respective identifier groups and can be included as elements in a hierarchical data structure. The communication control system 1A can suitably manage, by using such a data structure, the priorities assigned to respective identifier groups.

(Example Advantage of Communication Control System 1A)

Figure 11:
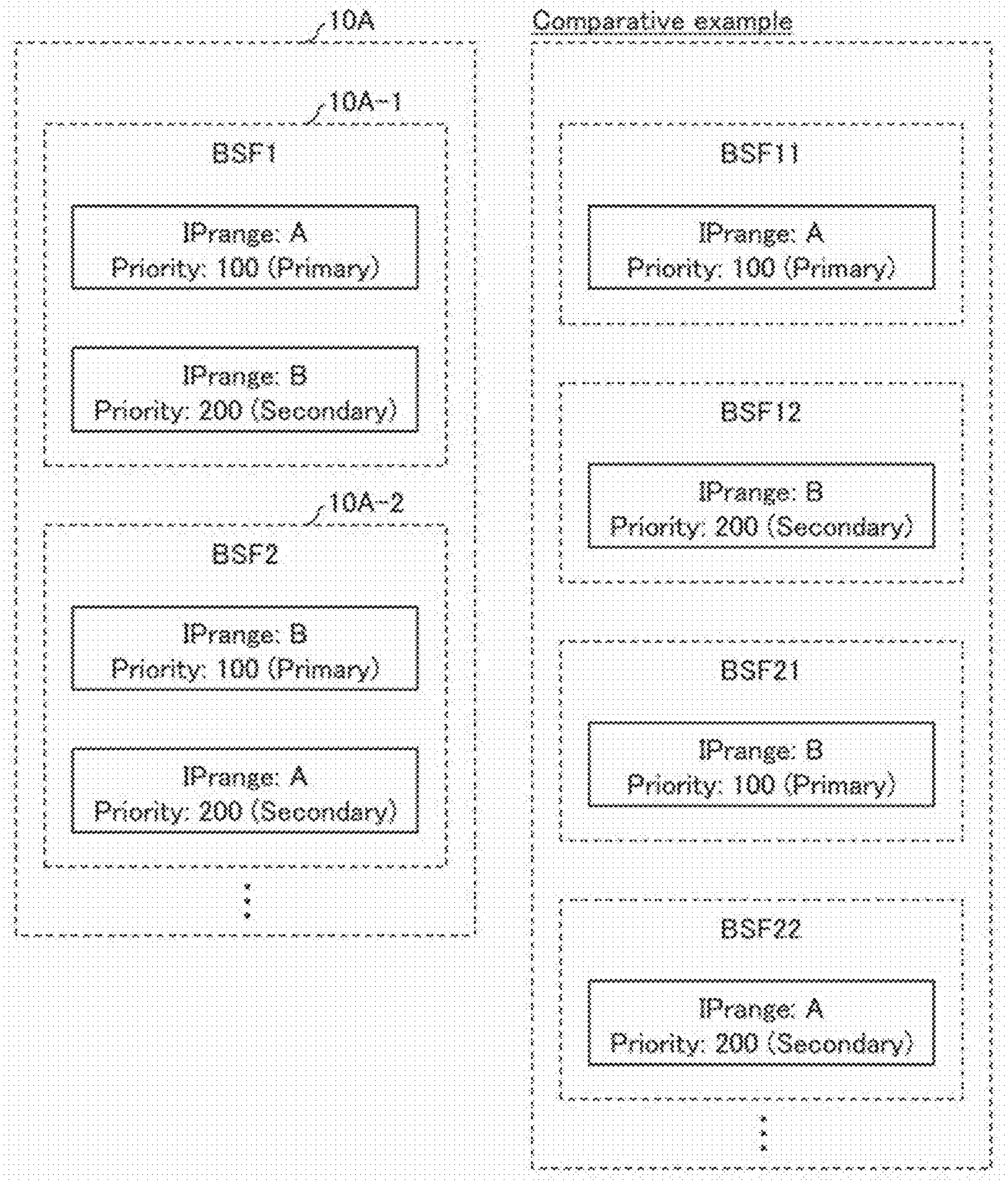
FIG. 11 is a diagram for describing an example advantage of a communication control system in accordance with an example aspect of the present disclosure.

The following description will discuss an example advantage of the communication control system 1A, with reference to FIG. 11. The left part of FIG. 11 shows a configuration of the first NF 10A in accordance with the present example embodiment, and the right part of FIG. 11 shows a configuration in accordance with a comparative example.

As illustrated in the right part of FIG. 11, in the configuration in accordance with the comparative example, a BSF instance (BSFs 11, 12, 21, and 22 in the right part of FIG. 11) is created for each IP address band, and priorities (Priority) are set to the respective BSF instances. The configuration in accordance with the comparative example constitutes, for example, an ACT/SBY configuration.

In contrast, in the BSFs (first NFs 10A-1 and 10A-2) in accordance with the present example embodiment, in each of the plurality of BSF instances (BSF 1 and BSF 2), a plurality of IP address bands (IPrange: A, IPrange: B) are managed in the same instance, and priorities (Priority) are given to respective IP address bands. The communication control system 1A in accordance with the present example embodiment constitutes, for example, an nACT configuration.

As such, in the communication control system 1A, priorities are given to the respective plurality of identifier groups. Therefore, it is possible to provide a communication control technique which can efficiently utilize resources. The configuration of the communication control system 1A can be suitably applied to an nACT configuration having a redundancy as described above, and it is possible to realize a communication control system that can efficiently utilize resources as compared with an ACT/SBY configuration in which priorities are given to respective instances.

[Software Implementation Example]

Part or all of the functions of the constituent elements (first NF (10, 10A), second NF (20, 20A), third NF (30, 30A), fourth NF (40A), and the like) included in the communication control system (1, 1A) may be realized by hardware such as an integrated circuit (IC chip) (i.e., may be realized as individual apparatuses), or may be realized by software (i.e., may be realized as instances deployed individually or separately on one or more apparatuses (physical servers)).

Figure 12:
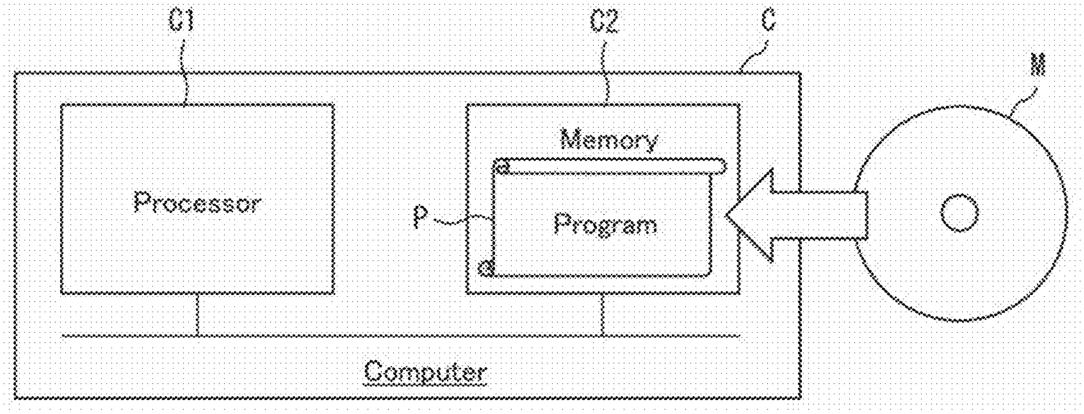
FIG. 12 is a block diagram illustrating a configuration of a computer which functions as an NF in accordance with an example aspect of the present disclosure.

In the latter case, each of the apparatuses is realized by, for example, a computer that executes instructions of a program that is software realizing the foregoing functions. An example (hereinafter, computer C) of such a computer is illustrated in FIG. 12. FIG. 12 is a block diagram illustrating a hardware configuration of the computer C which functions as each of the apparatuses.

The computer C includes at least one processor C1 and at least one memory C2. The memory C2 stores a program P for causing the computer C to function as each of the apparatuses. In the computer C, the processor C1 reads the program P from the memory C2 and executes the program P, so that the functions of each of the apparatuses are realized.

As the processor C1, for example, it is possible to use a central processing unit (CPU), a graphic processing unit (GPU), a digital signal processor (DSP), a micro processing unit (MPU), a floating point number processing unit (FPU), a physics processing unit (PPU), a tensor processing unit (TPU), a quantum processor, a microcontroller, or a combination of these. Examples of the memory C2 include a flash memory, a hard disk drive (HDD), a solid state drive (SSD), and a combination thereof.

Note that the computer C can further include a random access memory (RAM) in which the program P is loaded when the program P is executed and in which various kinds of data are temporarily stored. The computer C can further include a communication interface for carrying out transmission and reception of data with other apparatuses. The computer C can further include an input-output interface for connecting input-output apparatuses such as a keyboard, a mouse, a display and a printer.

The program P can be stored in a non-transitory tangible storage medium M which is readable by the computer C. The storage medium M can be, for example, a tape, a disk, a card, a semiconductor memory, a programmable logic circuit, or the like. The computer C can obtain the program P via the storage medium M. The program P can be transmitted via a transmission medium. The transmission medium can be, for example, a communication network, a broadcast wave, or the like. The computer C can obtain the program P also via such a transmission medium.

The present disclosure includes techniques described in supplementary notes below. Note, however, that the present invention is not limited to the techniques described in supplementary notes below, but may be altered in various ways by a skilled person within the scope of the claims.

[Additional Remark A]

The present disclosure includes techniques described in supplementary notes below. Note, however, that the present invention is not limited to the techniques described in supplementary notes below, but may be altered in various ways by a skilled person within the scope of the claims.

(Supplementary Note A1)

A communication control system including: a generation means for generating a storage request that includes (i) a plurality of identifier groups each of which includes one or more identifiers and (ii) priorities which are given to the respective plurality of identifier groups; and a requesting means for requesting a storage means to store information included in the storage request.

(Supplementary Note A2)

The communication control system according to supplementary note A1, in which: each of the one or more identifiers includes at least one selected from the group consisting of an IP address, a data network name, an IP domain, and an IP prefix.

(Supplementary Note A3)

The communication control system according to supplementary note A1 or A2, further including: a management means for managing the plurality of identifier groups, the management means managing, in a same instance, a plurality of identifier groups to which different priorities are given.

(Supplementary Note A4)

The communication control system according to any one of supplementary notes A1 through A3, further including: an acquisition means for acquiring request information which includes a target identifier; and a provision means for providing, as a response to the request information, response information which includes a network function address associated with the target identifier.

(Supplementary Note A5)

A communication control system including: a requesting means for making, to a storage means, a discovery request for a network function; and an acquisition means for acquiring, as a response to the discovery request, response information that includes (i) a plurality of identifier groups each of which includes one or more identifiers and (ii) priorities which are given to the respective plurality of identifier groups.

(Supplementary Note A6)

The communication control system according to supplementary note A5, further including: an identification means for identifying, with reference to the priorities included in the response information, a network function to be accessed.

(Supplementary Note A7)

The communication control system according to supplementary note A6, in which: the identification means compares priorities respectively given to a plurality of identifier groups in which a target identifier is included, and thus identifies the network function to be accessed.

(Supplementary Note A8)

A communication control system including: an acquisition means for acquiring a storage request that includes (i) a plurality of identifier groups each of which includes one or more identifiers and (ii) priorities which are given to the respective plurality of identifier groups; and a storage means for storing information included in the storage request.

(Supplementary Note A9)

The communication control system according to supplementary note A8, wherein: the acquisition means acquires a discovery request for a network function; and the communication control system further includes a provision means for providing, as a response to the discovery request, response information that includes (i) a plurality of identifier groups each of which includes one or more identifiers and (ii) priorities which are given to the respective plurality of identifier groups.

[Additional Remark B]

The present disclosure includes techniques described in supplementary notes below. Note, however, that the present invention is not limited to the techniques described in supplementary notes below, but may be altered in various ways by a skilled person within the scope of the claims.

(Supplementary Note B1)

A communication control method, including: a generation process in which at least one processor generates a storage request that includes (i) a plurality of identifier groups each of which includes one or more identifiers and (ii) priorities which are given to the respective plurality of identifier groups; and a requesting process in which the at least one processor requests a storage means to store information included in the storage request.

(Supplementary Note B2)

The communication control method according to supplementary note B1, in which: each of the one or more identifiers includes at least one selected from the group consisting of an IP address, a data network name, an IP domain, and an IP prefix.

(Supplementary Note B3)

The communication control method according to supplementary note B1 or B2, further including: a management process in which the at least one processor manages the plurality of identifier groups, in the management process, the at least one processor managing, in a same instance, a plurality of identifier groups to which different priorities are given.

(Supplementary Note B4)

The communication control method according to any one of supplementary notes B1 through B3, further including: an acquisition process in which the at least one processor acquires request information which includes a target identifier; and a provision process in which the at least one processor provides, as a response to the request information, response information which includes a network function address associated with the target identifier.

(Supplementary Note B5)

A communication control method including: a requesting process in which at least one processor makes, to a storage means, a discovery request for a network function; and an acquisition process in which the at least one processor acquires, as a response to the discovery request, response information that includes (i) a plurality of identifier groups each of which includes one or more identifiers and (ii) priorities which are given to the respective plurality of identifier groups.

(Supplementary Note B6)

The communication control method according to supplementary note B5, further including: an identification process in which the at least one processor identifies, with reference to the priorities included in the response information, a network function to be accessed.

(Supplementary Note B7)

The communication control method according to supplementary note B6, in which: in the identification process, the at least one processor compares priorities respectively given to a plurality of identifier groups in which a target identifier is included, and thus identifies the network function to be accessed.

(Supplementary Note B8)

A communication control method, including: an acquisition process in which at least one processor acquires a storage request that includes (i) a plurality of identifier groups each of which includes one or more identifiers and (ii) priorities which are given to the respective plurality of identifier groups; and a storage process in which the at least one processor stores information included in the storage request.

(Supplementary Note B9)

The communication control method according to supplementary note B8, in which: in the acquisition process, the at least one processor acquires a discovery request for a network function; and the communication control method includes a provision process in which the at least one processor provides, as a response to the discovery request, response information that includes (i) a plurality of identifier groups each of which includes one or more identifiers and (ii) priorities which are given to the respective plurality of identifier groups.

[Additional Remark C]

The present disclosure includes techniques described in supplementary notes below. Note, however, that the present invention is not limited to the techniques described in supplementary notes below, but may be altered in various ways by a skilled person within the scope of the claims.

(Supplementary Note C1)

A communication control program for causing a computer to function as a communication control system, the communication control program causing the computer to function as: a generation means for generating a storage request that includes (i) a plurality of identifier groups each of which includes one or more identifiers and (ii) priorities which are given to the respective plurality of identifier groups; and a requesting means for requesting a storage means to store information included in the storage request.

(Supplementary Note C2)

The communication control program according to supplementary note C1, in which: each of the one or more identifiers includes at least one selected from the group consisting of an IP address, a data network name, an IP domain, and an IP prefix.

(Supplementary Note C3)

The communication control program according to supplementary note C1 or C2, further causing the computer to function as: a management means for managing the plurality of identifier groups, the management means managing, in a same instance, a plurality of identifier groups to which different priorities are given.

(Supplementary Note C4)

The communication control program according to any one of supplementary notes C1 through C3, further causing the computer to function as: an acquisition means for acquiring request information which includes a target identifier; and a provision means for providing, as a response to the request information, response information which includes a network function address associated with the target identifier.

(Supplementary Note C5)

A communication control program for causing a computer to function as: a requesting means for making, to a storage means, a discovery request for a network function; and an acquisition means for acquiring, as a response to the discovery request, response information that includes (i) a plurality of identifier groups each of which includes one or more identifiers and (ii) priorities which are given to the respective plurality of identifier groups.

(Supplementary Note C6)

The communication control program according to supplementary note C5, further causing the computer to function as: an identification means for identifying, with reference to the priorities included in the response information, a network function to be accessed.

(Supplementary Note C7)

The communication control program according to supplementary note C6, in which: the identification means compares priorities respectively given to a plurality of identifier groups in which a target identifier is included, and thus identifies the network function to be accessed.

(Supplementary Note C8)

A communication control program causing a computer to function as: an acquisition means for acquiring a storage request that includes (i) a plurality of identifier groups each of which includes one or more identifiers and (ii) priorities which are given to the respective plurality of identifier groups; and a storage means for storing information included in the storage request.

(Supplementary Note C9)

The communication control program according to supplementary note C8, in which: the acquisition means acquires a discovery request for a network function; and the communication control program further causing the computer to function as a provision means for providing, as a response to the discovery request, response information that includes (i) a plurality of identifier groups each of which includes one or more identifiers and (ii) priorities which are given to the respective plurality of identifier groups.

[Additional Remark D]

The present disclosure includes techniques described in supplementary notes below. Note, however, that the present invention is not limited to the techniques described in supplementary notes below, but may be altered in various ways by a skilled person within the scope of the claims.

(Supplementary Note D1)

A communication control system including at least one processor, the at least one processor carrying out: a generation process of generating a storage request that includes (i) a plurality of identifier groups each of which includes one or more identifiers and (ii) priorities which are given to the respective plurality of identifier groups; and a requesting process of requesting a storage means to store information included in the storage request.

(Supplementary Note D2)

The communication control system according to supplementary note D1, in which: each of the one or more identifiers includes at least one selected from the group consisting of an IP address, a data network name, an IP domain, and an IP prefix.

(Supplementary Note D3)

The communication control system according to supplementary note D1 or D2, in which: the at least one processor further carries out a management process of managing the plurality of identifier groups; and in the management process, the at least one processor manages, in a same instance, a plurality of identifier groups to which different priorities are given.

(Supplementary Note D4)

The communication control system according to any one of supplementary notes D1 through D3, in which: the at least one processor further carries out an acquisition process of acquiring request information which includes a target identifier; and the at least one processor further carries out a provision process of providing, as a response to the request information, response information which includes a network function address associated with the target identifier.

(Supplementary Note D5)

A communication control system including at least one processor, the at least one processor carrying out: a requesting process of making, to a storage means, a discovery request for a network function; and an acquisition process of acquiring, as a response to the discovery request, response information that includes (i) a plurality of identifier groups each of which includes one or more identifiers and (ii) priorities which are given to the respective plurality of identifier groups.

(Supplementary Note D6)

The communication control system according to supplementary note D5, in which: the at least one processor further carries out an identification process of identifying, with reference to the priorities included in the response information, a network function to be accessed.

(Supplementary Note D7)

The communication control system according to supplementary note D6, in which: in the identification process, the at least one processor compares priorities respectively given to a plurality of identifier groups in which a target identifier is included, and thus identifies the network function to be accessed.

(Supplementary Note D8)

A communication control system including at least one processor, the at least one processor carrying out: an acquisition process of acquiring a storage request that includes (i) a plurality of identifier groups each of which includes one or more identifiers and (ii) priorities which are given to the respective plurality of identifier groups; and a storage process of storing information included in the storage request.

(Supplementary Note D9)

The communication control system according to supplementary note D8, in which: in the acquisition process, the at least one processor acquires a discovery request for a network function; and the at least one processor further carries out a provision process of providing, as a response to the discovery request, response information that includes (i) a plurality of identifier groups each of which includes one or more identifiers and (ii) priorities which are given to the respective plurality of identifier groups.

REFERENCE SIGNS LIST

1, 1A: Communication control system
10, 10A: First NF
11: Generation section (generation means)
12: Requesting section (requesting means)
13: Management section (management means)
14: Acquisition section (acquisition means)
15: Provision section (provision means)
20, 20A: Second NF
21: Acquisition section (acquisition means)
22: Storage section (storage means)
23: Provision section (provision means)
30, 30A: Third NF
31: Requesting section (requesting means)
32: Acquisition section (acquisition means)
33: Identification section (identification means)

The invention claimed is:

1. A communication control system comprising at least one processor and a plurality of instances executed in at least one of the processor, wherein each of the plurality of instances includes:
managing at least one identifier group; and
generating a storage request including the at least one identifier group, wherein the at least one identifier group managed by each of the plurality of instances is identical.

2. The communication control system according to claim 1, wherein:

different priorities are assigned to each of the plurality of instances for the identical identifier group.

3. The communication control system according to claim 1, wherein:

the plurality of instances are network functions.

4. The communication control system according to claim 1, wherein:

the identifier group is at least one of an IP address group, a data network name, a network name, an IP domain, and an IP prefix.

5. The communication control system according to claim 1, wherein the plurality of instances are network functions, and the identifier group is at least one of an IP address group, a data network name, a network name, an IP domain, and an IP prefix.

6. A communication control method, comprising:

executing, by at least one processor, a plurality of instances;

managing, by each of the plurality of instances, at least one identifier group; and generating, by each of the plurality of instances, a storage request including the at least one identifier group, wherein the at least one identifier group managed by each of the plurality of instances is identical.

7. The communication control method according to claim 6, wherein:

different priorities are assigned to each of the plurality of instances for the identical identifier group.

8. The communication control method according to claim 6, further comprising:

the plurality of instances are network functions.

9. The communication control method according to claim 6, wherein the identifier group is at least one of an IP address group, a data network name, a network name, an IP domain, and an IP prefix.

10. The communication control method according to claim 6, wherein the plurality of instances are network functions, and the identifier group is at least one of an IP address group, a data network name, a network name, an IP domain, and an IP prefix.

* * * * *